Sept. 24, 1935.  A. P. STEINER  2,015,415
ARC WHEEL MACHINE
Filed Aug. 18, 1932  5 Sheets-Sheet 1
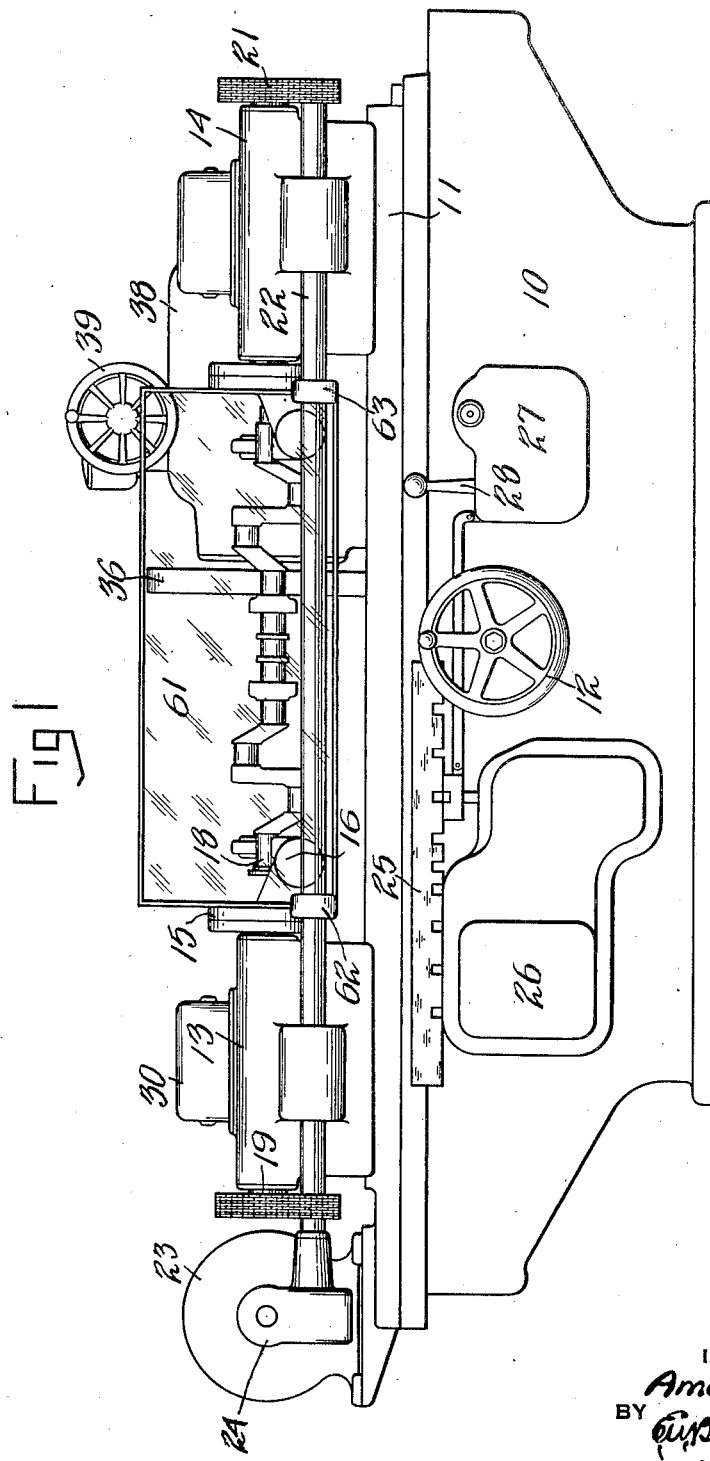
INVENTOR
Amos P. Steiner.
BY
ATTORNEY Sept. 24, 1935.  A. P. STEINER  2,015,415
ARC WHEEL MACHINE
Filed Aug. 18, 1932  5 Sheets-Sheet 2
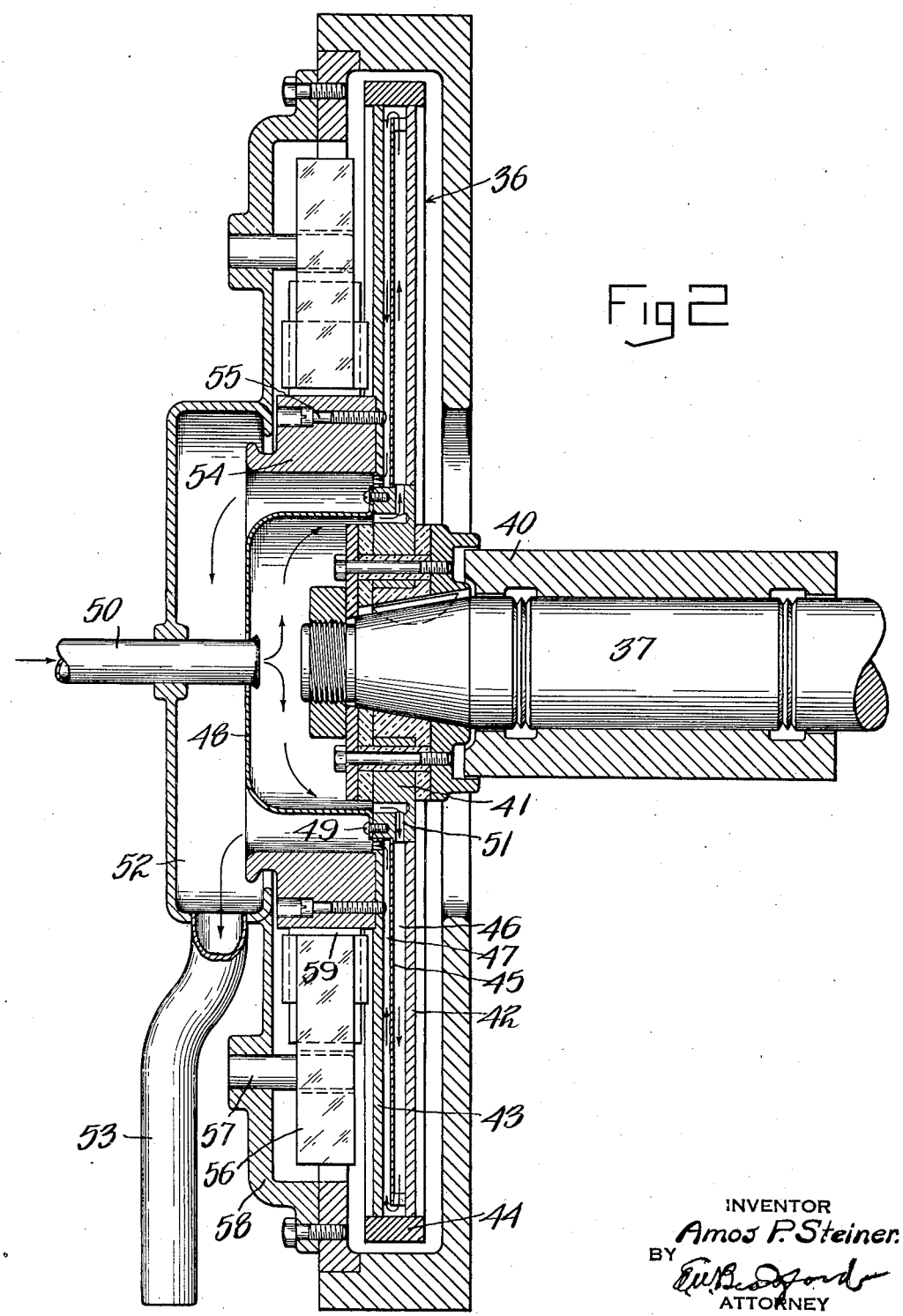
INVENTOR
Amos P. Steiner.
BY
ATTORNEY

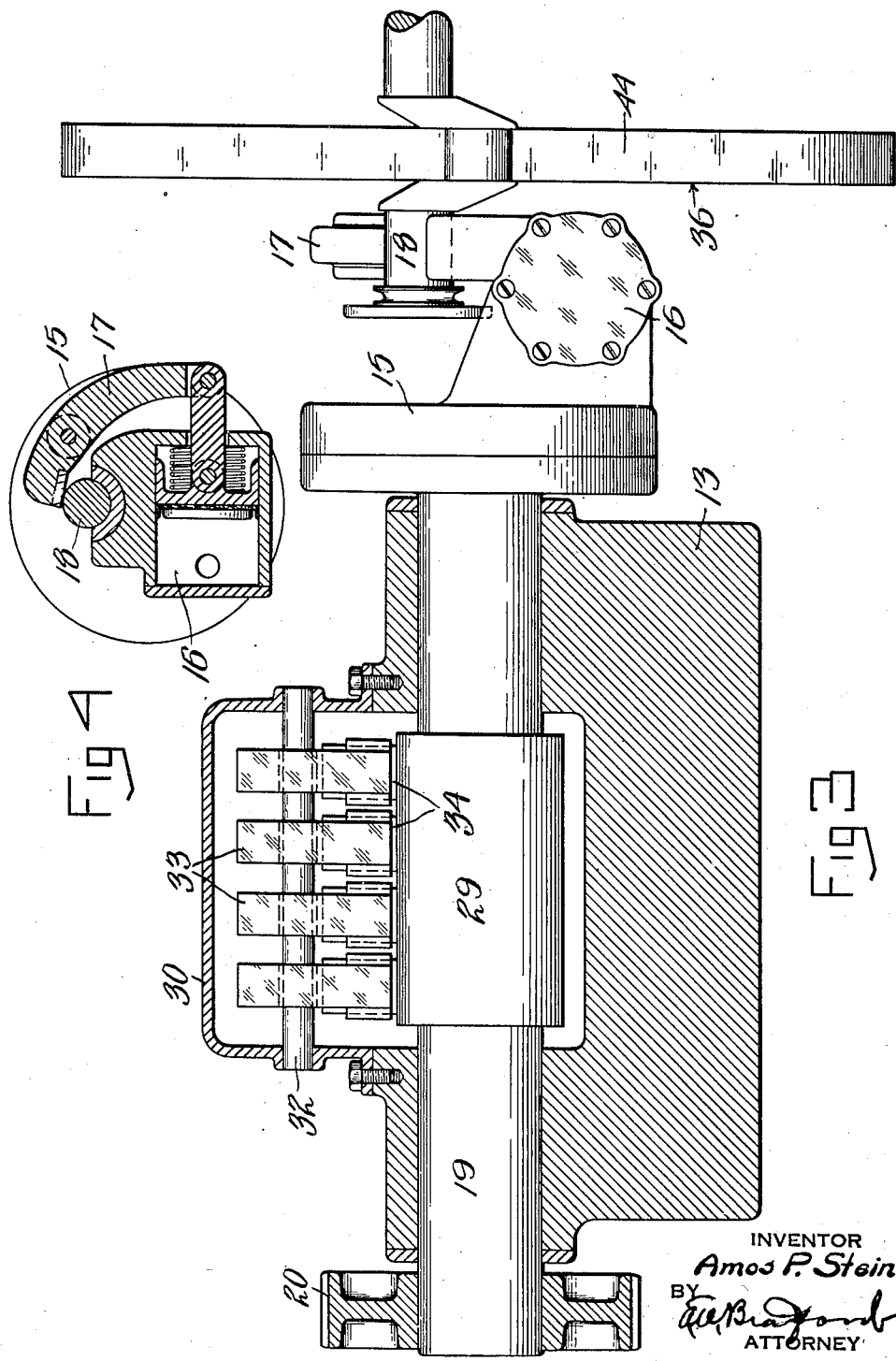

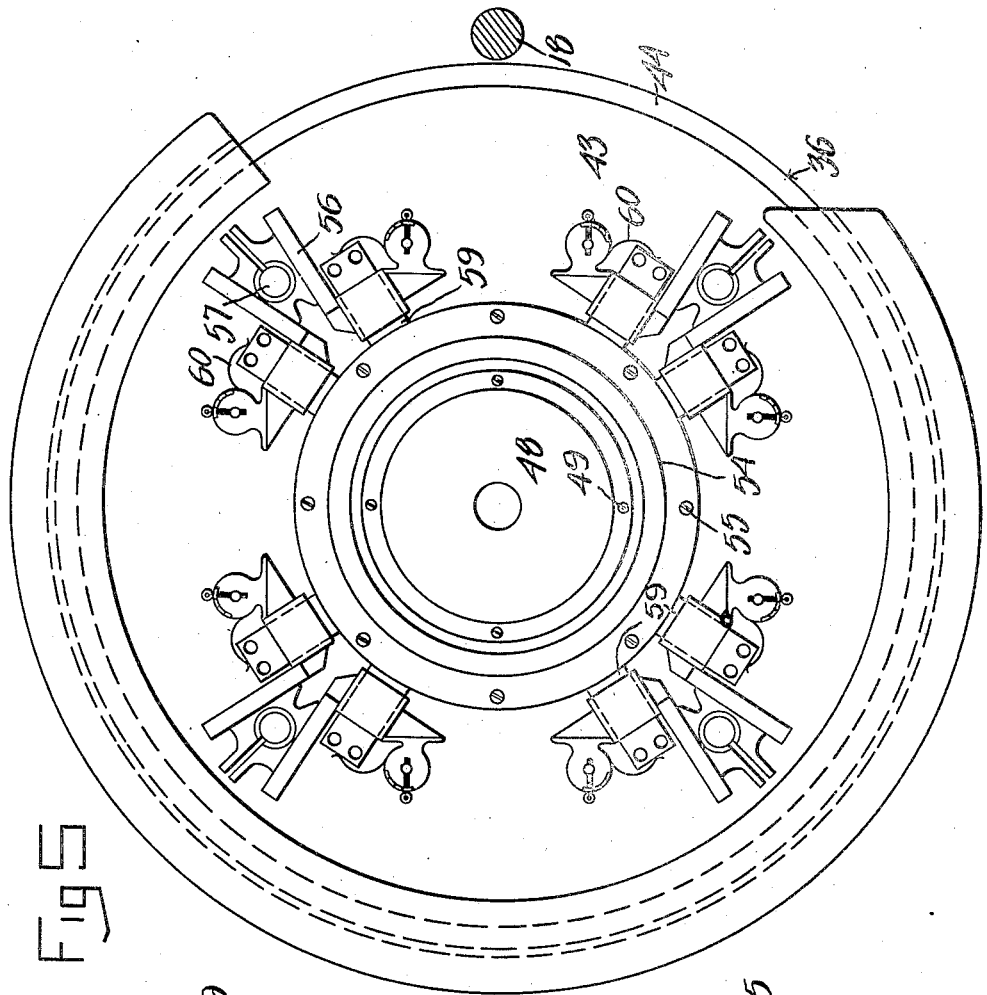

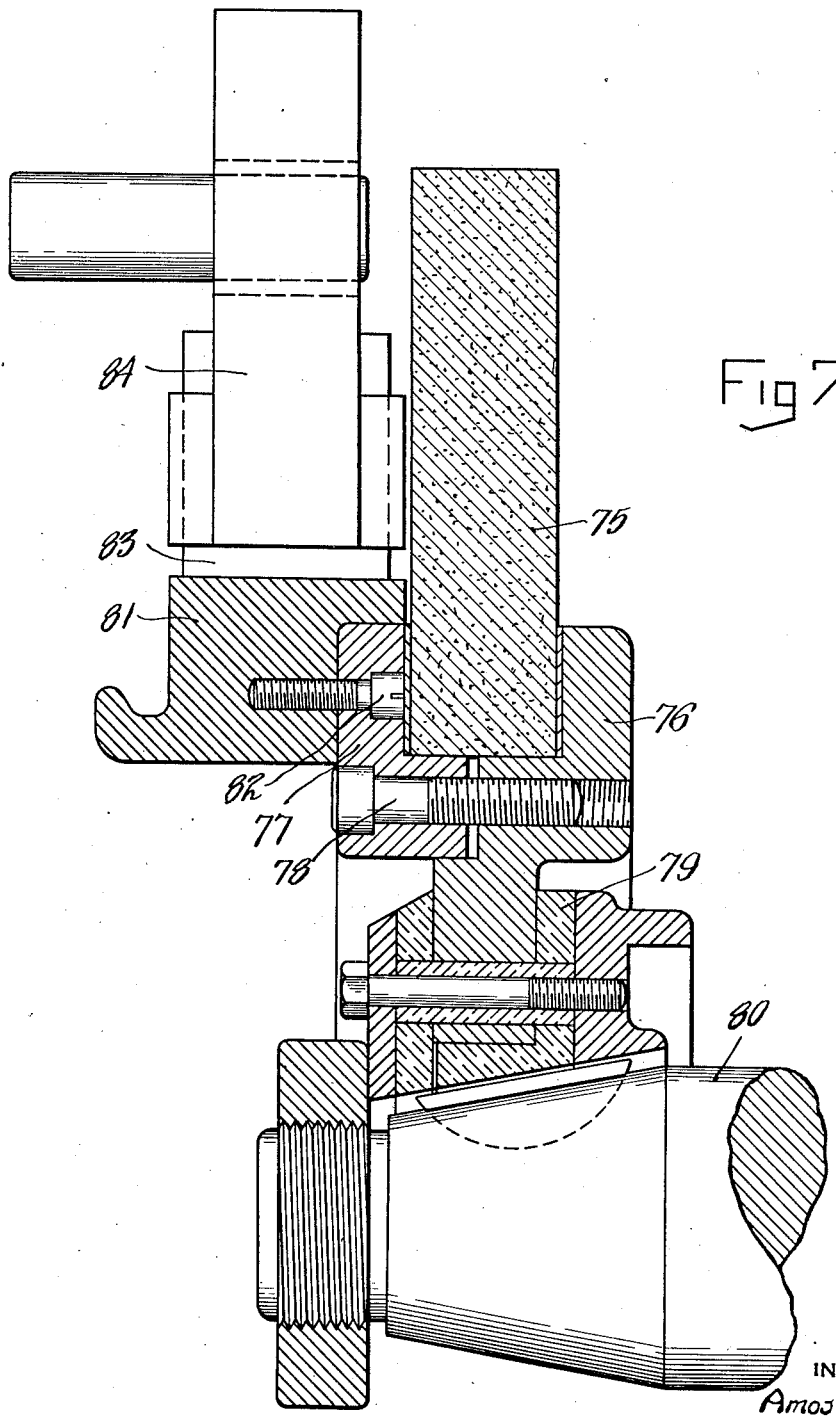

Patented Sept. 24, 1935

2,015,415

UNITED STATES PATENT OFFICE 2,015,415

ARC WHEEL MACHINE

Amos P. Steiner, Waynesboro, Pa., assignor to Landis Tool Company, Waynesboro, Pa., a corporation of Pennsylvania Application August 18, 1932, Serial No. 629,373

3 Claims. (Cl. 219—1)

This invention relates to machines and methods for reducing the size of work. While differing in many respects in its general character it may be defined as a grinding machine in that the operation is analogous to the abrasive action of a grinding machine.

More specifically the invention makes use of an electric arc for melting off the surface of work to reduce its size.

The object of the invention therefore is to provide electrical means and to apply the electric arc for reducing the size of the work.

Referring to the accompanying drawings, which are made a part hereof and on which similar reference characters indicate similar parts, Figure 1 is a front view in elevation of a machine embodying my invention, Figure 2, a section through the arc wheel, Figure 3, a section of the headstock, Figure 4, a sectional detail of a work clamping fixture, Figure 5, a side elevation of the arc wheel, Figure 6, a diagrammatic showing of the electric wiring, and Figure 7, a section through a modified form of arc wheel.

In the drawings numeral 10 indicates the bed of the machine which for purposes of convenience is shown as a crank grinding machine. A traverse work carriage 11 is mounted upon the bed of the machine and is operated in any well-known manner. Manual operation of the work carriage may be effected by means of a hand wheel 12 which is suitably and operably connected to means for traversing the carriage 11. Headstocks 13 and 14 are mounted upon the work carriage. These headstocks carry work clamping devices 15 shown in detail in Figure 4. The work clamping fixture 15 may be of any well-known or suitable construction, that shown being substantially the clamp fixture shown in my Patent 1,862,750 in which pressure fluid is supplied to a cylinder 16 to operate a lever 17, the free end of which engages the work 18. Headstock spindles 19 have suitable pinions or gears 20 on their outer end and are driven by means of chain belts 21 from a shaft 22. The shaft 22 is driven by means of an electric motor 23 through suitable reducing gear connections housed in a casing 24. Details of the driving connections are not shown since any suitable driving mechanism will be sufficient. The traverse carriage 11 is indexed automatically and locked in indexed position by suitable dogs engaging in notches in a spacing bar 25. Indexing of the carriage may be effected by automatic timing and indexing mechanism enclosed in housing 26 such as that shown in the copending application of Steiner et al. 384,068.

A reversing valve 27 is operated by a reversing lever 28 in the usual way. The work drive spindle 19 carries a brass collector ring 29. A housing 30 is secured upon the head stock 13 which carries the work driving spindle 19. Within the housing 30 is journaled a rod 32 which carries several brush holders 33 which holders carry contact brushes 34 which engage the collector ring 29. The brushes 34 are connected by a wire 35 with a source of electricity as will presently be described.

An arc wheel 36 is mounted upon a shaft 37 which shaft is rotatably mounted in a wheel base 38 which wheel base is movable toward and from the work in the usual manner and may be manually moved by means of the hand wheel 39. The shaft 37 is journaled in a bearing 40. The arc wheel is secured to a hub 41 which hub is insulated from the shaft 37. The arc wheel is composed of side members 42 and 43 which carry a metal ring 44 at their peripheries. A division plate 45 is positioned between the two side members so as to provide spaces 46 and 47 for the circulation of a cooling fluid through the arc wheel. A housing 48 is secured to the hub 41 by means of bolts 49 and a conduit 50 is connected to deliver cooling fluid into the housing 48. This cooling fluid is driven by centrifugal force through ports 51 into the space 46 and travels radially outwardly and returns to the space 47 into a chamber 52 from which it is exhausted through a pipe 53. The cooling fluid may be water or other cooling liquid or under certain circumstances it may be found advisable to use air or other gaseous cooling fluid. A collector ring 54 is secured by screws 55 to the side member 43 of the arc wheel. This collector ring is in electrical contact with the metal ring 44. Brush holders 56 are pivotally secured by pins 57 in a housing 58 which housing is in turn secured upon the bearing 40 or secured upon some other fixed portion of the wheel base. Contact brushes 59 are secured in the brush holders and are kept in contact with the collector ring 54 by means of springs 60. A colored glass shield 61 is positioned in front of the arc wheel and is hinged to brackets 62 and 63.

Figure 6 shows diagrammatically the electric circuits for operating the machine. Alternating current is supplied through wires 64 and 65. A magnetically operated switch 66 may be controlled through a pilot switch 67 and a solenoid 68. When the switch 66 is closed the primary winding of the transformer 69 is energized. The secondary winding 70 is grounded at 71. Circuit to the collector ring 29 is through wire 35. Circuit to the brushes 59 is through wire 72.

In operation the arc wheel is rotated by a suitable motor and the work is rotated at a slower speed by means of the motor 23. The arc formed between the metallic ring 44 and the periphery of the work is effective in reducing the surface of the work by burning it off.

The showing in Figure 1 of a crankshaft is purely for purposes of illustration, as the machine is in no sense limited to grinding or reducing the size of bearings or pins on a crankshaft. The indexing and the timing of the indexing of the work carriage moreover is or may be that shown in the copending application referred to. The machine therefore is adapted as a cam grinding machine or any other machine in which the work is to be gradually reduced in diameter.

In Figure 7 is shown a modified form in which an electrical conductive grinding wheel is used. The grinding wheel 75 is secured upon a hub 76 by means of a ring 77 which is secured to the hub by bolts 78. The hub 76 is suitably insulated by insulating material 79 from the shaft 80. A contact ring 81 is secured upon the hub 76 by means of screws 82. Brushes 83 carried by brush holders 84 provide electrical contact with the ring 81. In this form of the invention electrical contact is made through the conductive abrasive wheel so that an arc is formed between the periphery of the abrasive wheel and the work whereby a thin film of the work is gradually melted off and rubbed away by the periphery of the abrasive wheel.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A machine of the kind described comprising a work support adapted to accommodate cylindrical work, means for rotating the work, means for maintaining the work in circuit with a source of electric current, a wheel base, a shaft mounted in said base, a hub mounted on said shaft, an electrically conductive wheel mounted on said hub and insulated from said shaft, means for maintaining said wheel in circuit with the said source of electric current to create an arc between the periphery of the wheel and the periphery of the work, substantially as set forth.

2. A machine of the kind described comprising a work support adapted to accommodate cylindrical work, means for rotating the work, means for maintaining the work in circuit with a source of electric current, a wheel base, a shaft mounted in said base, a hub mounted on said shaft, an electrically conductive wheel mounted on said hub and insulated from said shaft, means for maintaining said wheel in circuit with the said source of electric current to create an arc between the periphery of the wheel and the periphery of the work, and means for circulating a cooling fluid through said wheel to cool the periphery of the wheel, substantially as set forth.

3. A machine of the kind described comprising a wheel base having a wheel with a metallic peripheral ring mounted thereon, means for maintaining the said metallic ring in circuit with a source of electric current, a work support traversable past said wheel, said work support being adapted to hold a cylindrical work piece mounted therein, a spindle for rotating said work substantially in axial alignment with said work, a collector ring on said spindle, a plurality of brushes in contact with said collector ring, said brushes being in circuit with the said source of electric current whereby an arc is created between the said metallic ring and the periphery of the said cylindrical work, substantially as set forth.

AMOS P. STEINER.